(12) United States Patent
Appelboom

(10) Patent No.: US 12,481,992 B2
(45) Date of Patent: Nov. 25, 2025

(54) AUTHENTICATING A TRANSACTION

(71) Applicant: Koninklijke KPN N.V., Rotterdam (NL)

(72) Inventor: Hubertus Mattheus Appelboom, Amstelveen (NL)

(73) Assignee: Koninklijke KPN N.V., Rotterdam (NL)

( * ) Notice: Subject to any disclaimer, the term of this patent is extended or adjusted under 35 U.S.C. 154(b) by 87 days.

(21) Appl. No.: 18/107,433

(22) Filed: Feb. 8, 2023

(65) Prior Publication Data

US 2023/0267463 A1     Aug. 24, 2023

(30) Foreign Application Priority Data

Feb. 21, 2022   (EP) .................................. 22157749

(51) Int. Cl.
*G06Q 20/40* (2012.01)
(52) U.S. Cl.
CPC ................................. *G06Q 20/401* (2013.01)
(58) Field of Classification Search
CPC ................................................. G06Q 20/401
See application file for complete search history.

(56) References Cited

U.S. PATENT DOCUMENTS

| | | | |
|---|---|---|---|
| 2016/0005108 A1* | 1/2016 | Willis | G06Q 30/0645 705/44 |
| 2017/0132656 A1* | 5/2017 | Marcus | G06Q 30/0234 |
| 2021/0117970 A1* | 4/2021 | Hugh | G06Q 20/4015 |
| 2022/0004617 A1* | 1/2022 | Irwin, III | G06F 21/40 |
| 2022/0222637 A1* | 7/2022 | Tax | G06Q 20/202 |

FOREIGN PATENT DOCUMENTS

EP      3 582 469 A1    12/2019

* cited by examiner

*Primary Examiner* — Raven E Yono
(74) *Attorney, Agent, or Firm* — Hamilton, Brook, Smith & Reynolds, P.C.

(57) ABSTRACT

The invention relates to a transaction verification system for authenticating a transaction performed at a transaction system. The transaction system provides a visual presentation of the transaction, comprising uncoded data and machine-extractable coded data. The transaction system also provides verification data for verifying one or more authenticity features of at least part of the uncoded data. The verification data can be obtained based on the coded data. A transaction verification device obtains, using an image interface, one or more camera images of the visual presentation of the transaction, and these camera images are then used to verify the one or more authenticity features based on the verification data.

16 Claims, 6 Drawing Sheets

AUTHENTICATING A TRANSACTION

RELATED APPLICATION

This application claims priority under 35 U.S.C. § 119 or 365 to European Application No. 22157749.7, filed Feb. 21, 2022. The entire teachings of the above application are incorporated herein by reference.

TECHNICAL FIELD

The invention relates to a transaction verification system, and to a transaction verification device, an authentication system, and a transaction system that may be used in the transaction verification system. The invention further relates to computer-implemented methods of verifying and performing a transaction, and to a computer-readable medium.

BACKGROUND

Digital transactions, such as payments and online purchases, are being used more and more, and are also being used for more and more critical applications, such as expensive purchases, tax filings, and health-related transactions. Unfortunately, this increase in the use of digital transactions is accompanied by an increase in the amount of cybercrime, such as ransomware, identity and data theft, and the like.

In particular, digital transactions are at risk of a so-called man-in-the-middle attack. In such an attack, a user thinks he is performing a legitimate transaction at a transaction system, for example at a website where the user wants to authorize a payment or perform a purchase. In fact, in such an attack, the transaction is intercepted and manipulated by a third party (the "man in the middle") such that, for example, the payment is performed to a different bank account than intended by the user, or the purchase is shipped to a different address than was intended.

A known mechanism to improve the security of digital transactions, is the use of a transaction verification device, such as a smartphone running a verification app, separate from the local system that the user is using to perform the transaction (e.g., the user's personal computer). The user may be asked to confirm the transaction using the app. For example, the website at which the transaction is performed, may show a QR code. The user may scan this QR code using the verification app. The verification app may show details of the transaction which the user can then verify and confirm. The details of the transaction may for example be included in the QR code, protected by a digital signature. Thus, the user may confirm transaction details that are harder to manipulate by a man-in-the-middle, reducing the risk of man-in-the-middle attacks.

However, there is still a desire to further reduce the risk of man-in-the-middle attacks on digital transactions.

SUMMARY

It would be desirable to further reduce the risk of man-in-the-middle attacks on digital transactions, and/or to provide more secure digital transactions in a more user-friendly way.

In accordance with an aspect of the invention, a transaction verification system is provided for authenticating a transaction. The transaction may be performed at a transaction system. The transaction system may be configured to provide a visual presentation of the transaction. The visual presentation may comprise uncoded data and machine-extractable coded data. The transaction system may be configured to provide verification data for verifying one or more authenticity features of at least part of the uncoded data. The transaction system may comprise a transaction verification device configured to obtain, using an image interface, one or more camera images of the visual presentation of the transaction. The transaction verification device, the transaction system, or an authentication system to which the transaction verification device is configured to provide the one or more camera images, may be configured to: based on the coded data, obtain the verification data from the transaction system; verify the one or more authenticity features based on the verification data; and provide a verification result based on the verifying.

In accordance with a further aspect of the invention, a transaction verification device is provided for authenticating a transaction. The transaction verification device may be for use in a transaction verification system as described herein. The transaction may be performed at a transaction system. The transaction verification device may comprise an image interface for obtaining camera images. The transaction verification device may comprise a processor subsystem configured to, using the image interface, obtain one or more camera images of a visual presentation of the transaction. The visual presentation may comprise machine-extractable coded data and uncoded data. The processor subsystem may be configured to extract the coded data from the one or more camera images. The processor subsystem may be configured to, based on the coded data, obtain verification data from the transaction system for verifying one or more authenticity features of at least part of the uncoded data. The processor subsystem may be configured to verify the one or more authenticity features based on the verification data. The processor subsystem may be configured to provide a verification result based on the verifying.

In accordance with a further aspect of the invention, an authentication system is provided for authenticating a transaction. The authentication system may be for use in a transaction verification system as described herein. The transaction may be performed at a transaction system. The authentication system may comprise a communication interface configured for communication with a transaction verification device. The authentication system may be configured to obtain, from the transaction verification device, one or more camera images of a visual presentation of the transaction. The visual presentation may comprise uncoded data and machine-extractable coded data. The authentication system may be configured to, based on the coded data, obtain verification data from the transaction system for verifying one or more authenticity features of at least part of the uncoded data. The authentication system may be configured to verify the one or more authenticity features based on the verification data. The authentication system may be configured to provide, for example to the transaction system, a verification result based on the verifying.

In accordance with a further aspect of the invention, a transaction system is provided for performing a transaction. The transaction system may be for use in a transaction verification system as described herein. The transaction system may comprise a data interface for accessing data representing the transaction. The transaction system may comprise a processor subsystem configured to provide a visual presentation of the transaction. The visual presentation may comprise machine-readable coded data and uncoded data. The processor subsystem may be further configured to provide verification data for verifying one or more authenticity features of at least part of the uncoded data.

In accordance with a further aspect of the invention, a computer-implemented method is provided of authenticating a transaction. The transaction may be performed at a transaction system. The method may comprise obtaining, from a transaction verification device, one or more camera images of a visual presentation of the transaction. The visual presentation may comprise uncoded data and machine-extractable coded data. The method may comprise, based on the coded data, obtaining verification data from the transaction system for verifying one or more authenticity features of at least part of the uncoded data. The method may comprise verifying the one or more authenticity features based on the verification data. The method may comprise providing a verification result based on the verifying.

In accordance with a further aspect of the invention, a computer-implemented method is provided of performing a transaction. The method may comprise providing a visual presentation of the transaction, wherein the visual presentation comprises uncoded data and machine-extractable coded data. The method may comprise providing verification data for verifying one or more authenticity features of at least part of the uncoded data.

In accordance with a further aspect of the invention, a transitory or non-transitory computer-readable medium is provided comprising data. The data may represent instructions which, when executed by a processor system, cause the processor system to perform a computer-implemented method described herein. Instead or in addition, the data may represent a visual presentation of a transaction comprising uncoded data and machine-extractable coded data for use by a transaction verification device or authentication system as described herein. Instead or in addition, the data may represent verification data for verifying one or more authenticity features of at least part of the uncoded data of a visual presentation of a transaction for use by a transaction verification device or authentication system as described herein.

A transaction verification system described herein may comprise a transaction system at which the transaction is performed. For example, the transaction may be carried out via a web application provided by the transaction system. The user may access this web application on a local system, such as a personal device, e.g. a personal computer, tablet PC, or mobile phone, for example, via a website, via a mobile application, and/or as a progressive web application. Other transaction systems are also possible: e.g., the transaction system can be an access control system for controlling access to one or more physical locations, e.g., rooms or buildings. Also in such cases there may be a local system with which the transaction is performed, such as a card reader associated with the access control system. More generally, the transaction may be a transaction between the transaction system and a local system. The user may for example perform, e.g., initiate, the transaction at the transaction system via the local system.

The transaction system may be configured to provide a visual presentation of the transaction. For example, the visual presentation can be in the form of a web page of a web application served by the transaction system, or as another type of visual presentation of the transaction, e.g., a visual presentation rendered by a native application that the user uses to carry out the transaction at their local system, based on data from the transaction system. The visual presentation may be displayed by the local system. In many cases, the visual presentation is specific for a particular instance of the transaction, e.g., the visual presentation may show a transaction identifier or other information related to the particular instance of the transaction. However, it is also possible to have a static visual presentation that is the same for multiple instances of the transaction and that also does not need to be displayed by the local system, e.g., a printed sign at an entrance controlled by an access control system, etc.

In order to authenticate the transaction, one or more camera images may be taken of the visual presentation of the transaction, e.g., by a user using a transaction verification device such as smartphone or other mobile device. This transaction verification device itself is typically different from the device that shows the visual presentation of the transaction, e.g., the local system. The camera images may capture a QR code or other machine-extractable coded data. In prior art techniques for authenticating transactions via web applications, such a QR code may be used to obtain transaction data that the user may then inspect and verify at the transaction verification device.

As the inventors realized, however, showing transaction details on the transaction verification device, and asking the user to verify them, is risky from a security perspective. It turns out that many users cannot be trusted to perform the verification in a sufficiently conscientious way. Once users become accustomed to confirming a transaction on a separate device, a significant percentage of users tends to develop a false sense of security and may confirm the transaction without properly checking all details. This is true especially if there is a relatively large number of transaction details.

Another reason why users may not properly check transaction details, is due to stress. Less tech-savvy users may find it stressful and complicated to work with smartphones and similar kinds of devices, and may be focused so much on operating the device in the right way, e.g., pressing the right buttons, that they focus less on the actual content being shown. The user can also be in a hurry and therefore not check the transaction details closely enough. Moreover, in practice, devices may be set up to approve transactions relatively easily, e.g., based on recognizing the face or fingerprint of the user, making it even easier for the user to ignore the task at hand of checking the transaction details. Finally, for certain information, such an URL of a website where the user is logging in, this information can be hard for a user to verify.

In any case, it turns out that, using existing techniques, users unintentionally approve faulty transactions in a significant amount of cases.

Interestingly, the inventors realized that the security of transactions may be improved by using the camera images captured by the transaction verification device not only to extract the coded data, but also to capture uncoded data that is included in the visual presentation of the transaction, and to automatically verify one or more of its authenticity features. The uncoded data may be data that is visually presented separate from the coded data, e.g., surrounding the coded data. The uncoded data may be human-readable, e.g., interpretable by a human, e.g., it may be used to visually present information about the transaction to the user, e.g., transaction details, a logo, a URL, and the like. This is unlike the coded data which is typically provided for extraction by the transaction verification device, such as a QR code, and not for human interpretation (even if it may not be theoretically impossible for the user to manually interpret the coded data, and likewise, even if a computer may also be able to interpret the uncoded data, e.g., by using OCR or image analysis or the like). By coded data, data is meant that is represented such that it can be extracted by a computer, such as by means of a QR code or other type of bar code. For example, the data may not be visually represented as text. The term "coded" per se does not refer to the use of an error-correcting code, data compression or encryption, although all are possible.

To this end, the party performing the verification of the authenticity features (which can be the transaction verification device, but also the transaction system, or an authentication system to which the transaction verification device is configured to provide the one or more camera images), may use the coded data to obtain verification data from the transaction system. As also discussed elsewhere, the verification data may for example be obtained by being included in the coded data in a tamper-proof way, and/or by being requested out-of-band. The verification data may indicate one or more authenticity features of at least part of the uncoded data that may be verified. For example, the verification data may contain web address data that can be verified against a web address shown in the representation of the transaction, and/or may contain transaction data that can be verified against transaction details that are visible in the visual presentation, etc. Based on the verifying, a verification result may be provided.

Thus, the visual presentation may comprise separate coded and uncoded data. Based on the coded data, verification data may be obtained. This verification data is typically not based on the uncoded data. The verification data may then be used to verify the one or more authenticity features of at least part of the uncoded data. This verification typically does not verify the coded data, in particular this verification may not have to verify the coded data when other verification measures or security measures are in place to guarantee the authenticity of the coded data (although it may verify a position of an authenticity feature with respect to the coded data, for example).

By performing an automated verification of authenticity features, the security of the transaction is improved. For example, the authenticity features may include one or more human-inspectable authenticity features that the user may be expected to verify completely by themselves according to prior art techniques. Security no longer (or no longer solely) relies on a verification by the human, which as mentioned is error-prone. Thus, man-in-the-middle attacks, in which a user is tricked into performing a different transaction because the transaction is manipulated between the transaction system and the user, are made more difficult. This for example includes attacks where an attacker manipulates the transaction before it reaches a local system at which the user is performing the transaction ("pure" man-in-the-middle attacks), as well as attacks where an attacker manipulates the transaction at the local system itself (such as "man-in-the-browser" attacks where the attacker manipulates the transaction by infecting a web browser used to perform the transaction).

It also becomes possible to perform authenticity checks that are hard or impossible to be performed well by a user. An example of this is a visual inspection of the presentation, e.g., the website, for example in terms of colours or logos shown. Although a user could perform such a check, instructing them to perform this check via the transaction verification device is not feasible or in any case not convenient. Another advantage compared to asking the user to check certain information, is that it can remain hidden to an attacker what authenticity features, or even what kinds of authenticity features, are being checked. This makes it harder for the attacker to try to perform an attack in such a way that the verification of the authenticity feature succeeds. The provided techniques are furthermore more convenient because less manual steps by the user are needed, e.g., it may suffice for the user to verify that the visual presentation of the transaction is correct without the need to verify this information again on the transaction verification device.

Typically, the verification result is provided to the transaction system at which the transaction is performed. The verification result may be associated with, e.g., may comprise, a transaction identifier included in the coded data. This way, the verification result may be linked to the transaction whose authenticity features have been verified in the visual presentation. The verification result may indicate that the transaction is authenticated successfully, e.g., if the one or more authenticity features are successfully verified, possibly in combination with a confirmation of the transaction provided by the user at the transaction verification device. Upon a successful verification result, the transaction system may act accordingly by performing the transaction, e.g., by carrying out the payment transaction, by providing access to the requested location, by logging in the user, etc.

A verification result may also be provided indicating that the transaction is not authenticated successfully, e.g., in case one or more of the authenticity features failed to verify, and/or if the user failed to confirm the transaction. The verification result may in this case provide information indicating a reason of the failure, e.g., indicating which authenticity features(s) failed to verify, or even providing the camera image(s) that failed to pass the verification. Also in this case the transaction system may act accordingly, e.g., by aborting the transaction, re-trying authentication, switching to a different authentication mechanism, etc. It is not necessary that the verification result is provided to the transaction system, however; e.g., the verification result could also be provided to a third party for further carrying out the transaction, such as a payment provider; or the verification result could be displayed on the transaction verification device itself, where the user e.g. has the possibility to manually approve or disapprove the transaction regardless of the verification result.

In an embodiment, the verification of the authenticity features is performed at the transaction verification device. This may be beneficial since this means that the camera image(s) do not need to be transmitted to another party. This is preferable from a privacy point of view and also saves bandwidth. It is however also possible that the steps of extracting, obtaining, and/or verifying are performed by a different system, such as an authentication system or the transaction system, in which case the described transaction verification system may be configured to directly or indirectly provide the camera images and/or the extracted coded data to that other system.

In an embodiment, the verification of the authenticity features may be performed by an authentication system that is different from the transaction verification device and also different from the transaction system. From a privacy perspective, this may be advantageous because the camera images do not need to be shared with the transaction system. Another advantage of this set-up may be that the transaction verification device does not need to know exactly how the authenticity features are verified. Since the transaction verification device is typically a user device, it may be relatively easy for an attacker to reverse-engineer how the transaction device verifies the authenticity features; the attacker may then use this information to try to circumvent this verification. By performing the verification at another device, this is prevented.

However, it is not needed for the authentication system to perform the verification. For example, the authentication system may also be configured to obtain the camera images from the transaction verification device and forward them to the transaction system for verification. Instead of verifying the camera images, the authentication system may be configured to obtain the verification data from the transaction system, for example based on a transaction identifier received from the transaction verification device, and to forward the verification data to the transaction verification device.

An advantage of the providing of the verification data by the transaction system is that the transaction system enables the transaction to be performed more securely. For example, the transaction system may provide the verification data by sending it to a transaction verification device or authentication device, or by including the verification data in the visual presentation, e.g., as part of a QR code. The transaction verification device or authentication device may verify the authenticity features based on the verification data.

In an embodiment, the transaction system may be configured to obtain a verification result, e.g., from the transaction verification device or authentication device. The processor subsystem may also be configured to perform the verification internally by providing the verification data to verification functionality of the transaction system itself. This functionality may then obtain one or more camera images of the visual presentation and use these to verify the authenticity features. The latter has the advantage that the transaction system does not need to share details about how the verification of the authenticity features is performed with other parties, making it harder for an attacker to reverse-engineer this information in an effort to circumvent the verification.

In an embodiment, the coded data comprised in the visual presentation of the transaction may be presented as a bar code, in particular a QR code. Such a representation allows efficient and reliable automated extraction. The coded data is typically not for human use anyway, so that a representation optimized for computerized extraction is preferred. The uncoded data may be human-readable, e.g., human-interpretable and meant for human use, on the other hand.

In an embodiment, the transaction may be visually presented on a screen of a local system used to perform the transaction. The local system may be a personal computer, such as a desktop computer, a laptop, a 2-in-1 laptop, a tablet, or even a mobile device such as a(nother) smartphone. The local system may be different from the transaction verification device. The transaction verification device may accordingly take one or more camera images of at least part of the screen of the local system in order to verify the authenticity features. The transaction may be performed via a web browser or native application running on the local system, for example. The local system is typically operated by the user and may also be owned by the user, but this is not needed, e.g., the local system may be a transaction terminal, an access card reader, etc.

In an embodiment, the transaction may be a login, for example, at a website. By protecting the login against man-in-the-middle attacks, attempts to steal the user's login credentials may be prevented or at least detected, and it may be prevented that the user is logging in to a different website than intended, e.g., a copy of the website where the user may then be manipulated into entering sensitive information. In an embodiment, the transaction may be a payment transaction (for example, at a bank or other financial institution), a purchase (e.g., at a webshop or other shop), or another type of business-like transaction. In such cases, protecting against man-in-the-middle attacks may thwart attempts to let the user perform an unintended transaction, e.g., a payment with a different amount and/or to a different party, a purchase of a different good and/or with a different shipping address, and the like. In an embodiment, the transaction may be an access request, e.g., to a physical location or to a digital asset. In such cases, by protecting against man-in-the-middle attacks it may be prevented that the attacker gains access to the asset or to another asset that the user is tricked into requesting access to.

Various kinds of authenticity features are possible. Non-limiting examples are provided below. The number of authenticity features that are verified may for example be at least three or at least five. Authenticity features may also be referred to as security features or verification features. The automated verification of an authenticity feature may correspond to a verification that the user can feasibly perform themselves, and which may accordingly be performed on behalf of the user instead. The authenticity feature may concern visible aspects of the visible presentation of the transaction, and may in particular concern uncoded data of the visible presentation, apart from the coded data. The data may be "uncoded" in the sense that the data may be verified corresponding to how a user may interpret it. For example, the verification may comprise detecting a presence of a QR-code but not extracting data encoded in the QR-code; the QR-code may in that case be considered uncoded data for that reason. In other examples, the uncoded data that is verified does not comprise any QR code or more generally does not comprise any bar code at all.

In an embodiment, an authentication feature may be verified by obtaining web address data from the verification data and verifying that a browser window visible in the one or more camera images shows a web address that matches the web address data. Accordingly, it may be verified that the coded data is shown in the correct website. For example, this prevents protection against an important class of attacks where the attacker has obtained the coded data by performing a transaction itself with the transaction system, and has copied the coded data into a different website showing a different transaction. Such an attack is typically carried out externally from the browser, e.g., it is not a man-in-the-browser attack. This check may optionally be augmented by checking a visual indication of the browser that the connection to the web address is secure, such as a lock icon or the like. The verification may comprise matching the full web address shown to the web address data, e.g., not just the domain name. Although visual verification of a web address could be performed by a user, this is error-prone especially for longer web addresses, small characters that are easily overlooked such as "." or "_", or characters or words that at a quick glance look very similar, so automating this check is particularly advantageous for security.

In an embodiment, an authentication feature may be verified by obtaining transaction data from the verification data, and verifying that transaction details are visible in the one or more camera images that match the transaction data. For example, the transaction data may comprise an amount and/or destination of a payment, and/or a product and/or shipping address of an order. Such transaction details may in prior art systems be verified by the user, and can be made more secure by automated verification. For physical access, the transaction data may comprise a name of the building, room, an address, or (the name of) the entrance or door for which access is requested. This way, it can be ensured that the transaction is carried out as shown to the user in the visual presentation, without manipulation by an attacker.

In an embodiment, an authentication feature may be verified by obtaining website display data from the verification data and verifying that a web page portion is visible in the one or more camera images that visually matches the webpage display data. For example, it may be verified if a logo is visible, if a background of the visual presentation matches, if a given geometric shape such as a line or circle is present, if a font type is correct, if a certain amount of open space is present, etcetera. The webpage display data can for example be provided as an image of the expected visual presentation, or as computer code for rendering the visual presentation, e.g., HTML code or the like. By performing this verification, it can be detected that the attacker is showing to the user a completely different website than intended, or that the attacker is showing a visually imperfect copy of the website, for example.

In an embodiment, position data may be obtained from the verification data. The position data may indicate an expected position of an authenticity feature in the visual presentation of the transaction. For example, the position data may indicate a position and/or direction of the authenticity feature relative to the coded data in the visual presentation of the transaction. The position data may be used to verify the authenticity feature. For example, a position of the web address, the transaction data, or the web page portion to be verified may be specified, which may both make it easier to perform the verification and may make the verification stronger by verifying that the authenticity feature is not only visible but also visible at the correct position.

In an embodiment, the transaction verification device may be configured to show, on a display of the transaction verification device, a camera image being taken of the visual presentation of the transaction. The transaction verification device may be configured to indicate the position of the authenticity feature in the shown camera image. This way, the user may be assisted in producing a camera image from which the authenticity features can be successfully verified. This is relevant since, apart from the coded data, also at least part of the uncoded data needs to be captured. Assisting the user is particularly relevant in case the type of authenticity feature to be checked differs from transaction system (e.g., website) to transaction system, or even between transactions at the same transaction system. In such cases, which parts of the visual presentation need to be captured, may differ.

In an embodiment, the transaction verification device may be configured to obtain an expected presentation of the authenticity feature from the verification data and to overlay the expected presentation in the shown camera image at the expected position of the authenticity feature. This way, the user provides improved guidance to take the right camera image because the user can visually match the expected and actual presentations.

In an embodiment, the same camera image may be used both to extract the coded data and to verify the one or more authenticity features; or, the camera images used to verify the one or more authenticity features may be different from the camera image used to extract the coded data, but it may be verified that the former camera images used, show the same coded data as was extracted from the latter camera image. This way, it may be made more difficult for the attacker to temporarily change the coded and/or uncoded data being shown, and to thereby trick the user into authenticating a different transaction than was intended. When extracting the coded data and verifying the authenticity features in different camera images, the attacker may effectively be provided with a temporal degree of freedom. By using the same camera image or ensuring that the coded data is not changed between camera image, this degree of freedom may be eliminated. For example, it may be prevented that, at a time during the visual presentation, an attacker swaps the coded data for the real coded data and in this way attempts to manipulate which transaction goes through. In an embodiment, the transaction verification device may in addition be configured to verify that part or parts of the visual presentation that are used to verify the authenticity features, insofar as visible in the camera image from which the coded data are extracted, are the same in these former and latter camera images, thus making temporal manipulation still harder for the attacker.

The verification data may be obtained from the transaction system in several ways, in particular, by being included in the coded data in a tamper-proof way, and/or by being requested out-of-band.

In an embodiment, the verification data, or at least part of it, is included in the coded data. This is convenient because no additional communication is needed to obtain this data. In this case, it is preferred if this verification data is cryptographically protected such that an attacker cannot unnoticeably manipulate and/or read this transaction data. For example, this verification data may be encrypted for the intended recipient and/or digitally signed. Preventing unnoticed manipulation, in other words, tamper-protecting the verification data (for example, using a digital signature) is advantageous since it avoids that an attacker can modify the authenticity features that are to be verified. Preventing the attacker from reading the verification data (for example, using encryption) is advantageous since it avoids that an attacker gains knowledge about the fact that authenticity features are being checked in the present transaction, and/or which ones. Such knowledge by the attacker is undesired because it may help the attacker to circumvent the checks, and/or may allow the attacker to selectively attack transactions that are not protected by authenticity features or for which he has a relatively high chance of making the verification of the authenticity features succeed.

In an embodiment, the coded data may comprise a transaction identifier. The verification data, or at least part of it, may be obtained from the transaction system by requesting this data using the transaction identifier. The verification data may thus be obtained out-of-band with respect to the visual presentation of the transaction. For example, if the transaction is carried out using a local system, e.g., via a web application, then the verification data may be requested out-of-band in the sense that it is not the local system that requests the verification data but, for example, the transaction verification device. For example, the verification data may be obtained by the requester directly, or indirectly via an authentication system as described herein.

Obtaining the verification data from the transaction system has the advantage that a man-in-the-middle attacker may not be able to manipulate the verification data, since it is provided via a different channel than the coded data. Moreover, the attacker may not be able to obtain the verification data to learn which authentication features are being checked for the present transaction. In particular, although the man-in-the-middle may request the verification data using the coded data, this means the verification data is requested twice, which the transaction system can detect. Or, the transaction system may be configured to provide the verification data only to specific other systems, such as the authentication system or specific transaction verification devices, so not to the attacker. In fact, by not including the verification data in the coded data, the fact that a verification of authenticity features is taking place in the transaction may even remain hidden to the attacker altogether. For example, transaction identifiers are in many cases included in coded data also if no authenticity features are being checked, so the presence of the transaction verifier may not hint the attacker towards the use of authenticity features. This provides extra protection in particular when the verification of authenticity features has just been adopted and the attacker is not aware of this yet, or in large ecosystems where authenticity features are being verified for some transactions but not others, since an attacker may see the attack fail without directly knowing why.

In an embodiment, the transaction verification device may be configured to obtain a confirmation of the transaction via a user interface. For example, the user may confirm the transaction by entering a secret, such as a pin code or a swipe pattern, and/or using biometrics, such as facial recognition or a fingerprint. The transaction verification device may send the confirmation to the transaction system, possibly via an authentication system as described herein. Optionally, obtaining the confirmation may comprise showing information about the transaction and obtaining confirmation of this information. Thus, use of the transaction verification device to authenticate transactions may be protected so that others than the user, i.e. the authorized user, cannot use it to authenticate the transactions.

In an embodiment, the transaction verification device may be a mobile device, such as a mobile phone or a tablet. Such devices are convenient for making camera images of a visual presentation of a transaction, and the user may in practice often have such mobile devices at hand when they want to perform a transaction. For example, the functionality of the transaction verification device may be provided as an app to be used on a generic mobile device, for example for Android, iOS, etc.

In an embodiment, the authentication system may be configured to authenticate transactions at multiple different transaction systems. For example, the authentication system and the transaction verification device, or at least its software, may be provided by the same party. This way a unified authentication experience can be provided both to users and to transaction systems, which is both convenient and more reliable.

In an embodiment, the transaction system may be configured to determine the verification data by selecting a subset of authenticity features to be checked from an overall set of authenticity features. For example, the selection may be random or pseudo-random. For example, an authenticity feature may be a check of a particular subset of transaction details, or a particular web page portion. The respective authenticity features from which a selection is made, may be defined independently from any particular transaction (e.g., "check total amount"). At least the selected authenticity features may be instantiated for the transaction at hand (e.g., check for the text "Total amount: € 39,95" in the visual presentation). Accordingly, which subset of transaction details or web page portions are verified, may differ from transaction to transaction. This may make it harder for an attacker to go unnoticed, because it is harder to learn from previous transactions which authenticity features may be checked in a next transaction.

In an embodiment, the transaction may be carried out via a web application. The web application may be accessed at a local device using a web browser or other software application, for example. Generally, a web application may be any dynamically generated web page provided by a web server, such as an e-commerce website for making purchases, a banking website for making payments, or a website with a login functionality for accessing protected content or functionality, for example.

In an embodiment, the transaction system may be configured to, upon obtaining a verification result indicating that the transaction is verified, provide a cookie to the web application indicating that the transaction is authenticated. Thus, the cookie may be provided by the transaction system to the local system that is used to access the web application. As is known per se, the local system may store the cookie and provide the cookie to the transaction system in a later transaction. The transaction system may be configured to, upon obtaining the cookie in the later transaction, use fewer or no authenticity features in the later transaction. For example, the verification by the transaction verification device may be skipped altogether in the later transaction. This provides extra convenience to the user while still providing a degree of security because the verification of authenticity features was successfully performed in the original transaction. It is also possible to use a smaller number of authenticity features. This may also be convenient for the user e.g. because it may be easier to capture the smaller number of authenticity features on camera, e.g., only authenticity features that are relatively close to the coded data in the visual presentation may be used. Also in this case, extra convenience may be provided while still ensuring that authenticity features for the user have been verified at least previously.

It will be appreciated by those skilled in the art that two or more of the above-mentioned embodiments, implementations, and/or optional aspects of the invention may be combined in any way deemed useful.

Modifications and variations of any computer-implemented method and/or any computer readable medium, which correspond to the described modifications and variations of a corresponding device or system, can be carried out by a person skilled in the art on the basis of the present description.

BRIEF DESCRIPTION OF THE DRAWINGS

These and other aspects of the invention will be apparent from and elucidated further with reference to the embodiments described by way of example in the following description and with reference to the accompanying drawings, in which.

It should be noted that the figures are purely diagrammatic and not drawn to scale. In the figures, elements which correspond to elements already described may have the same reference numerals.

DETAILED DESCRIPTION OF EMBODIMENTS

Figure 1A:
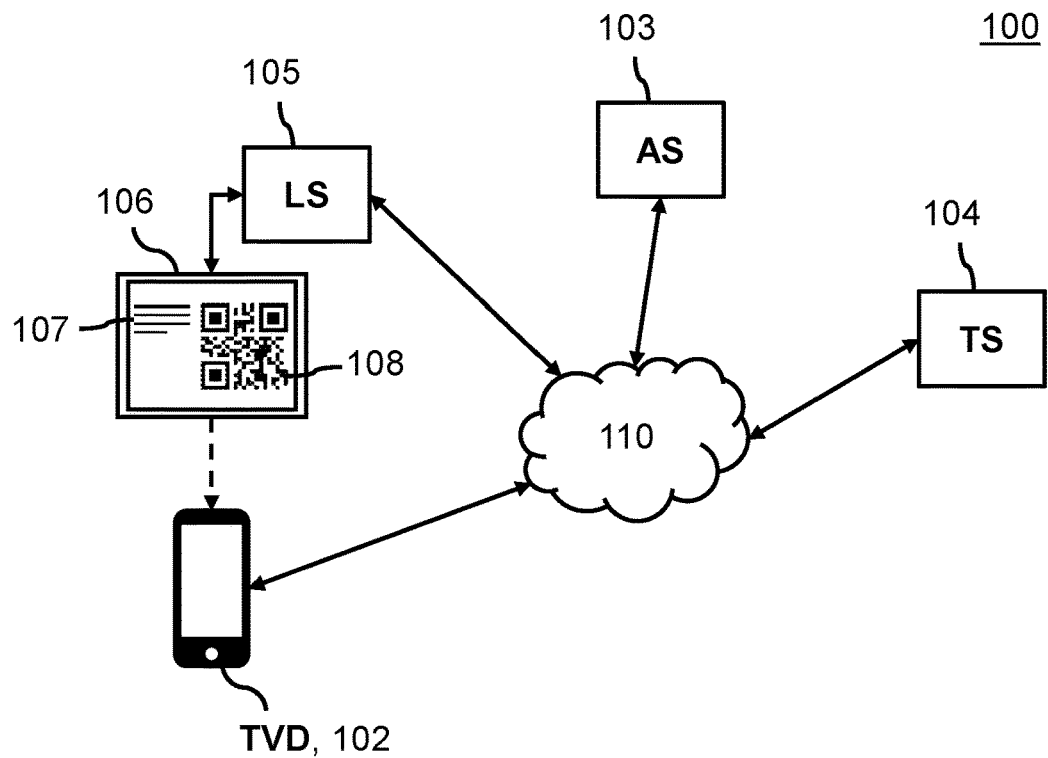
FIG. 1a shows a transaction verification system.

FIG. 1*a* shows a transaction verification system 100. The transaction verification system 100 may be for authenticating a transaction performed at a transaction system TS, 104. A transaction system may also be known as a relying party, a resource provider, or a resource server.

In this example, the transaction is performed at the transaction system TS using a local system LS, 105. The local system LS may be a user device of the user carrying out the transaction, for example, a personal computer such as a laptop or desktop computer. For example, the transaction may be carried out using a web browser that runs on the local system LS and accesses a web application, e.g., a dynamically generated website, provided by transaction system TS. For example, the transaction may be a login, a payment transaction or other business-like transaction, a purchase, or an access request to a digital asset.

Transaction system TS may be configured to provide a visual presentation 106 of the transaction. In the case of a web application, the visual presentation 106 may be the website using which the transaction is presented to the user. As illustrated in the figure, the local system LS may present the visual presentation 106 by showing the website on a screen. The visual presentation may comprise machine-readable coded data 108. As an illustration, a QR code 108 is shown, but other types of barcode or computer-readable code may readily be used. The coded data 108 is typically unique for the transaction at hand, e.g., it may be dynamically generated for the transaction. Apart from the coded data 108, e.g., to the left, right, top, and/or bottom of the coded data, the visual presentation may comprise uncoded data 107. As an illustration, the figure shows textual transaction details 107 provided as information to the user.

Transaction system TS may be further configured to provide verification data for verifying one or more authenticity features of at least part of the uncoded data. Examples of authenticity features and corresponding verification data are given throughout this specification. For example, the verification data may comprise transaction data, for which it may be verified that transaction details 107 of the visual presentation 106 match this transaction data. In this example, the transaction details 107 are thus an authenticity feature of the visual presentation.

The transaction verification system 100 may further comprise a transaction verification device TVD, 102. The transaction verification device TVD may be configured to obtain, using an image interface, one or more camera images of the visual presentation 106 of the transaction. For example, the transaction verification device TVD may be a mobile device with a camera, and the user may use the camera to capture an image of the visual presentation 106, e.g., by making a picture of the screen of the local system LS, or part of it. For example, a user may start an authentication app on the transaction verification device TVD, where the app is the configured to let the user capture one or more camera images of the visual presentation of the transaction, in particular of the coded data and of the uncoded data that is used to verify the authenticity features.

In this example, the transaction verification system 100 further comprises an authentication system AS, 103. The authentication system may be configured to act as an intermediary between the transaction verification device TVD and the transaction system TS. For example, the transaction verification device TVD may provide confirmation of the transaction to the transaction system TS via the authentication system AS, and/or the transaction verification device TVD may obtain the verification data from the transaction system TS via the authentication system AS. The authentication software on the transaction verification device TVD may for example be provided by the same party that operates the authentication system AS, thus allowing authentication services to be provided to a flexible set of users and transaction systems. The authentication system AS may provide additional services such as anomaly detection of transactions, white- or blacklisting, etcetera. The authentication system may also be referred to as an authentication service, or an authentication platform.

Interestingly, in transaction verification system 100, a verification of the authenticity features of the visual presentation 106 may be performed. To this end, the coded data 108 may be extracted from the one or more camera images, e.g., the data that is encoded in the QR code, bar code, or the like, may be obtained from the camera image. Based on the coded data 108 of the visual presentation 106, verification data may be obtained from the transaction system TS for verifying one or more authenticity features of at least part of the uncoded data 107. Further, the one or more authenticity features may be verified based on the verification data, and a verification result may be provided based on the verifying. For example, a verification result may indicate that verification was successful (e.g., all authenticity features are correctly verified); that verification was unsuccessful (e.g., at least one authenticity feature is not correctly verified, e.g., does not match or cannot be determined), and/or may indicate a confidence level of the verification.

In an embodiment, this verification is performed by the transaction verification device TVD. The transaction verification device may obtain the verification data by reading it from the coded data 108 itself, and/or by obtaining it out-of-band from the transaction system TS, for example, via the authentication system AS. In this embodiment, the camera images of the visual presentation do not need to leave the transaction verification device TVD. The transaction verification device TVD may provide the verification result to the transaction system TS.

In other embodiments, the verification may be performed by the authentication system AS, and/or by the transaction system TS. The transaction verification device may provide the camera images to transaction system TS (possibly via the authentication system AS), or to the authentication system AS, as appropriate. The authentication system AS may provide the verification result to the transaction system TS. In these embodiments, the transaction verification device TVD may not need to obtain the verification data, such that details about the verification can remain hidden from this device. The transaction verification device TVD may still obtain information about the authenticity features, e.g., to assist the user to take a picture that includes the authenticity features as described herein. Interestingly, however, if the verification is not performed by the transaction verification device TVD, it is less important to tamper-proof and/or hide this information, making it easier to transfer it.

As illustrated in the figure, the various devices typically communicate with each other using one or more computer networks 110, for example, the internet. In a typical embodiment, the local system LS may access a web application provided by the transaction system TS via the internet 110. Also, the transaction verification device TVD may interact with the authentication system AS, and the authentication system AS may interact with the transaction system TS, via the internet 110. The local system LS and transaction verification device TVD are typically two distinct devices that do not interact directly with each other for the purpose of the transaction, except for the camera images being taken by the transaction verification device of the screen of the local system LS.

Figure 1B:
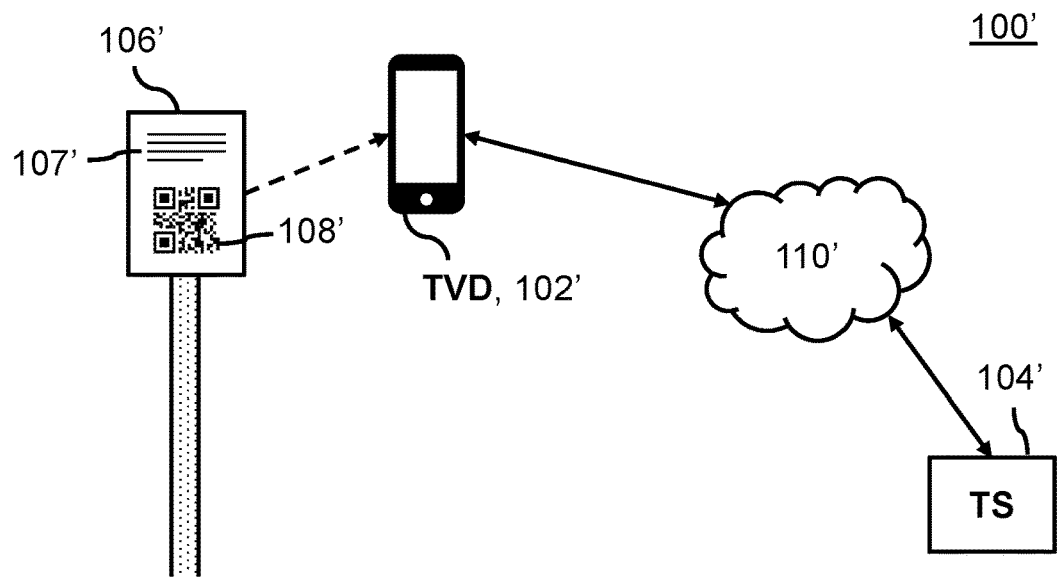
FIG. 1b shows a transaction verification system.

FIG. 1b shows a transaction verification system 100'. The transaction verification system 100' may be for authenticating a transaction performed at a transaction system TS, 104'.

In this example, the transaction is an access request to a physical asset, e.g., a room or a building. The transaction may be visually presented by the transaction system TS for example via a local access control point device that controls the access to the physical asset, e.g., that locks or unlocks the door. This is an example of a local device that is not owned or controlled by the user performing the transaction.

For example, as illustrated in the figure, the local device may comprise an access card reader 106' (also known as access control card reader), such as a magnetic stripe reader, a bar code reader, a proximity reader, a smart card reader, or a biometric reader. The local device may communicate with the transaction system TS to provide information about access requests made by users. The local device may provide a visual presentation of the transaction, for example via the access card reader 106'. The visual presentation may comprise machine-readable coded data, e.g., a QR code 108' as illustrated by the figure; and uncoded data, e.g., textual information about the transaction 107' as illustrated by the figure. The visual presentation may be dynamically generated and shown on a display, but it is also possible to use a static visual presentation, e.g., a print-out of the textual information 107' and the QR code 108'. The visual presentation in this embodiment may also comprise the physical surroundings of the local device, e.g., as an authenticity feature it may be verified that the surroundings of the local device visually match expected surroundings.

The transaction verification system 100' may further comprise a transaction verification device TVD, 102'. The transaction verification device TVD may be configured to obtain, using an image interface, one or more camera images of the visual presentation of the transaction. For example, the transaction verification device TVD may be a mobile device with a camera.

The transaction system TS may be configured to provide verification data for verifying one or more authenticity features of at least part of the uncoded data. These authenticity features may be verified. The verification may be performed by the transaction verification device TVD, which may for this purpose extract the coded data from the one or more camera images; based on the coded data, obtain the verification data from the transaction system TS; verify the one or more authenticity features based on the verification data; and provide a verification result based on the verifying, for example, to the transaction system TS. The verification can also be performed by the transaction system TS, which for this purpose may obtain the one or more camera images from the transaction verification device; verify the one or more authenticity features based on the verification data; and provide a verification result based on the verifying. The transaction system TS may, upon obtaining a verification result indicating that the authenticity features were verified successfully, provide access to the physical asset, e.g., by instructing the local system to provide the access.

As illustrated in the figure, the various devices of transaction verification system 100' may communicate using one or more computer networks 110', e.g., the Internet. For example, the transaction verification device TVD may communicate with the transaction system TS via the computer network e.g., to exchange the verification result, the camera images, and/or the verification data. Although not shown in the figure, the local device, if any, may also communicate via a computer network 110'.

Figure 2:
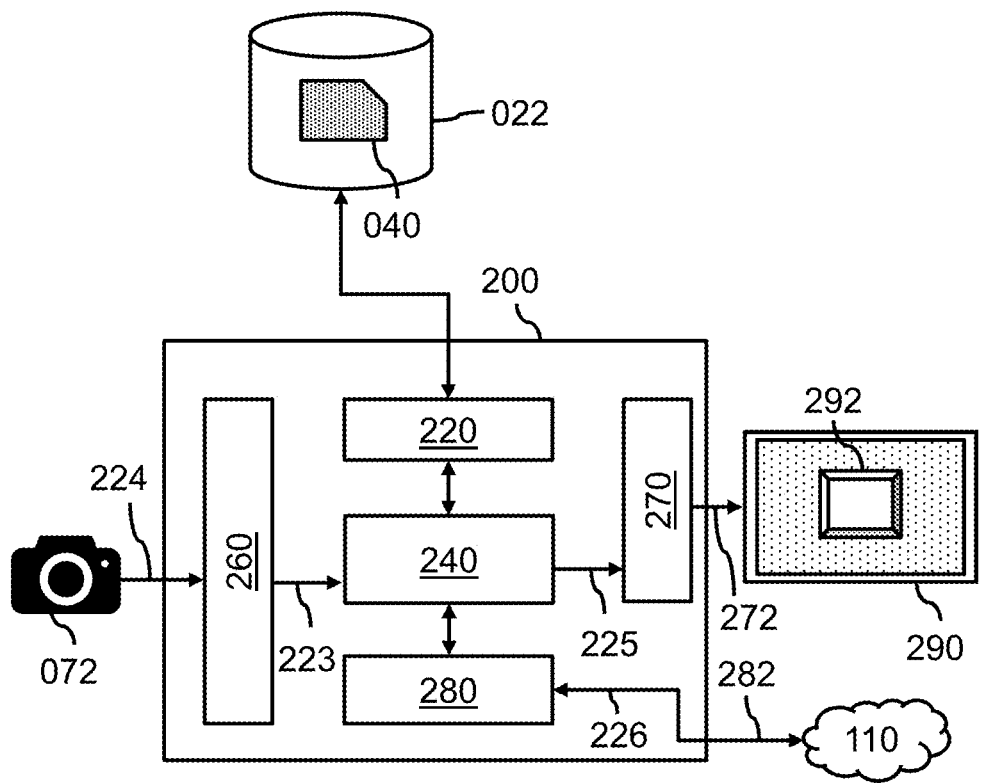
FIG. 2 shows a transaction verification device.

FIG. 2 shows a transaction verification device 200. The transaction verification device may be for authenticating a transaction performed at a transaction system. The device 200 may be for use in a transaction verification system, e.g., device 200 may correspond to device 102 of FIG. 1a or device 102' of FIG. 1b. Device 200 may be a mobile device such as a mobile phone (in particular a smartphone), a tablet device, a smart watch, smart glasses, etc. In some examples, the device 200 may be a so-called User Equipment (UE) of a mobile telecommunication network, such as a 5G or next-gen mobile network.

The device 200 may comprise a data interface 220. The data interface 220 may be for accessing verification data 040 for verifying one or more authenticity features as described herein, and/or other information such as camera images and extracted coded data. For example, as also illustrated in FIG. 2, the data interface 220 may be constituted by a data storage interface 220 which may access the data 040 from a data storage 022. For example, the data storage interface 120 may be a memory interface or a persistent storage interface, e.g., a hard disk or an SSD interface, but also a personal, local or wide area network interface such as a Bluetooth, Zigbee or Wi-Fi interface or an ethernet or fibreoptic interface. The data storage 022 may be an internal data storage of the system 200, such as a hard drive or SSD, but also an external data storage, e.g., a network-accessible data storage. In some embodiments, the data may each be accessed from a different data storage, e.g., via a different subsystem of the data storage interface 220. Each subsystem may be of a type as is described above for the data storage interface 220.

The device 200 may further comprise an image interface 260 for obtaining image data 224 representing one or more camera images captured by a camera 072. The camera 072 may but does not need to be part of the device 200. The camera interface 260 may have any suitable form corresponding in type to the type of sensor, including but not limited to a low-level communication interface, e.g., based on I2C or SPI data communication; a data storage interface of a type as described above for the data interface 220; or an internal communication interface. Camera interface 260 may internally communicate with processor subsystem 240 via data communication 223.

The device 200 may further comprise a processor subsystem 240 which may be configured to, during operation of the device 200, using the image interface, obtain one or more camera images of a visual presentation of the transaction. The visual presentation may comprise machine-extractable coded data and uncoded, e.g., human-inspectable, data. The processor subsystem 240 may be further configured to extract the coded data from the one or more camera images. The processor subsystem 240 may be further configured to, based on the coded data, obtain verification data from the transaction system for verifying one or more authenticity features of at least part of the uncoded data. The processor subsystem 240 may be further configured to verify the one or more authenticity features based on the verification data. For example, some or all of the authenticity features may be human-inspectable authenticity features. The processor subsystem 240 may be further configured to provide a verification result based on the verifying.

The device 200 may further comprise a display interface 270 for providing display data 272 to a display 290, which may or may not be part of the device 200 itself. For example, the display 290 may be used to show a camera image 292 being taken, optionally with positions of one or more authenticity features shown in the camera image. The display 290 may also be used to show transaction details of the transaction to the user. Display interface 270 may internally communicate with processor subsystem 240 via data communication 225. The device 200 may further comprise an input interface (not shown) for obtaining user inputs from an input component, such as a touchscreen, a keyboard, or a fingerprint reader, that may be internal or external to the device 200. The input interface may be used to obtain a confirmation of the transaction from the user, for instance. The image interface 260 can also act as an input interface, for example for facial recognition.

The device 200 may also comprise a communication interface 280 configured for communication 282 e.g. with other systems of the transaction verification system, such as an authentication system or a transaction system. Communication interface 280 may internally communicate with processor subsystem 240 via data communication 226. Communication interface 260 may be arranged for direct communication with the other systems, e.g., using USB, IEEE 1394, or similar interfaces. Communication interface 260 may also communicate over a computer network 110, for example, a wireless personal area network, an internet, an intranet, a LAN, a WLAN, etc. For instance, communication interface 260 may comprise a connector, e.g., a wireless connector, an Ethernet connector, a Wi-Fi, 4G or 4G antenna, a ZigBee chip, etc., as appropriate for the computer network. Communication interface 260 may also be an internal communication interface, e.g., a bus, an API, a storage interface, etc.

Figures 3, 4:
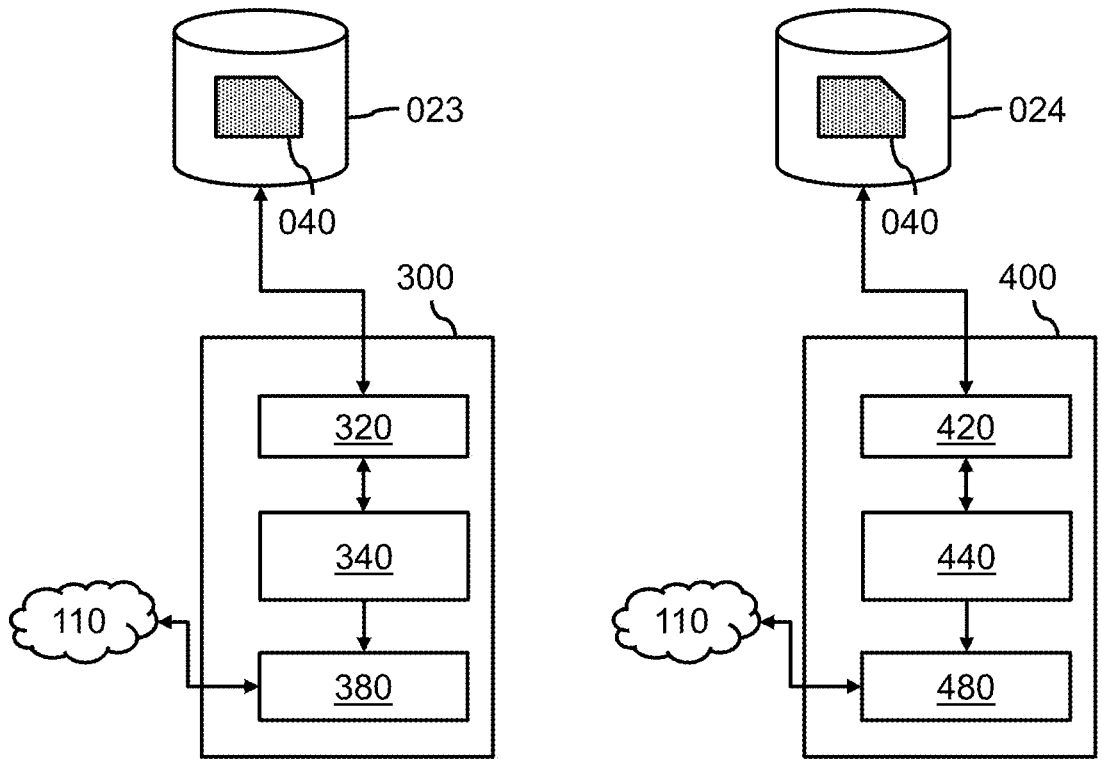
FIG. 3 shows an authentication system.
FIG. 4 shows a transaction system.

FIG. 3 shows an authentication system 300. Authentication system 300 may be for authenticating a transaction. The transaction may be performed at a transaction system. Authentication system 300 may be for use in a transaction verification system, e.g., system 300 may correspond to system 103 of FIG. 1a.

The system 300 may comprise a data interface 320 for accessing verification data 040 for verifying one or more authenticity features as described herein. For example, as also illustrated in FIG. 3, the data interface may be constituted by a data storage interface 320 which may access the data 040 from a data storage 023. In general, the data interface 320 and the data storage 023 may be of a same type as described with reference to FIG. 2 for the data interface 220 and the data storage 022.

The system 300 may further comprise a communication interface 380 configured for communication e.g. with other components of the transaction verification system, such as a transaction verification device and/or a transaction system, e.g., via a computer network 110. The authentication system 300 may be configured to authenticate transactions at multiple different transaction systems. Its communication interface 380 may accordingly be configured for communication with these respective transaction systems. The communication interface 380 may be of a same type as described with reference to FIG. 2 for the communication interface 280.

The system 300 may further comprise a processor subsystem 340. The processor subsystem 340 may be configured to, during operation of the device 300, obtain, from the transaction verification device, one or more camera images of a visual presentation of the transaction. The visual presentation comprises uncoded data and machine-extractable coded data. The processor subsystem 340 may be configured to, based on the coded data, obtain verification data from the transaction system for verifying one or more authenticity features of at least part of the uncoded data. The processor subsystem 340 may be configured to verify the one or more authenticity features based on the verification data. The processor subsystem 340 may be configured to provide a verification result based on the verifying, e.g., to the transaction system and/or to the transaction verification device.

In alternative embodiments, the authentication system does not verify the authenticity features itself. The processor subsystem 340 may in such embodiments be configured to forward the verification data from the transaction system to the transaction verification device and/or to forward the verification result and/or camera images from the transaction verification device to the transaction system.

It will be appreciated that the same considerations and implementation options apply for the processor subsystem 340 as for the processor subsystem 240 of FIG. 2. It will be further appreciated that the same considerations and implementation options may in general apply to the system 300 as for the device 200 of FIG. 2, unless otherwise noted.

FIG. 4 shows a transaction system 400. Transaction system 400 may be for performing a transaction, for example, with a local system operated by a user that performs the transaction. Transaction system 400 may be for use in a transaction verification system, e.g., system 400 may correspond to system 104 of FIG. 1a or system 104' of FIG. 1b.

Transaction system 400 may comprise a data interface 420. Data interface 420 may be for accessing data representing the transaction. Data interface may be for accessing verification data 040 for verifying one or more authenticity features as described herein. For example, as also illustrated in FIG. 4, the data interface may be constituted by a data storage interface 420 which may access the data 040 from a data storage 024. In general, the data interface 420 and the data storage 024 may be of a same type as described with reference to FIG. 2 for the data interface 220 and the data storage 022.

The system 400 may further comprise a communication interface 480 configured for communication with other components of the transaction verification system, such as a transaction verification device and/or an authentication system, e.g., via a computer network 110. The communication interface 480 may be of a same type as described with reference to FIG. 2 for the communication interface 280.

The system 300 may further comprise a processor subsystem 340. The processor subsystem 340 may be configured to provide a visual presentation of the transaction. The visual presentation may comprise uncoded data and machine-extractable coded data. The processor subsystem 340 may be further configured to provide verification data for verifying one or more authenticity features of at least part of the uncoded data, for example, to a transaction verification device or to an authentication system. The verification data may be included in the coded data and/or sent out-of-band, for example. The processor subsystem 340 may optionally be configured to obtain a verification result, e.g., from the transaction verification device or the authentication system. The processor subsystem 340 may be configured to carry out the transaction if the verification result indicates that the transaction is successfully authenticated, for instance.

In some embodiments, the processor subsystem 340 may be configured to obtain from the transaction verification device, optionally via an authentication system, one or more camera images of the visual presentation of the transaction. The processor subsystem 340 may be configured to verify the one or more authenticity features in the obtained images based on the verification data and to provide a verification result based on this verification.

It will be appreciated that the same considerations and implementation options apply for the processor subsystem 440 as for the processor subsystem 240 of FIG. 2. It will be further appreciated that the same considerations and implementation options may in general apply to the system 400 as for the device 200 of FIG. 2, unless otherwise noted.

In general, each system or device described in this specification, including but not limited to the device 200 of FIG. 2 and the systems 300 and 400 of FIGS. 3 and 4, may be embodied as, or in, a single device or apparatus, such as a workstation or a server. The device may be an embedded device. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit. The respective system may also be implemented in a distributed manner, e.g., involving different devices or apparatuses, such as distributed local or cloud-based servers. The transaction verification device of FIG. 2 may be a mobile device. The authentication system and/or transaction system of FIGS. 3-4 may be server devices.

Figure 5A:
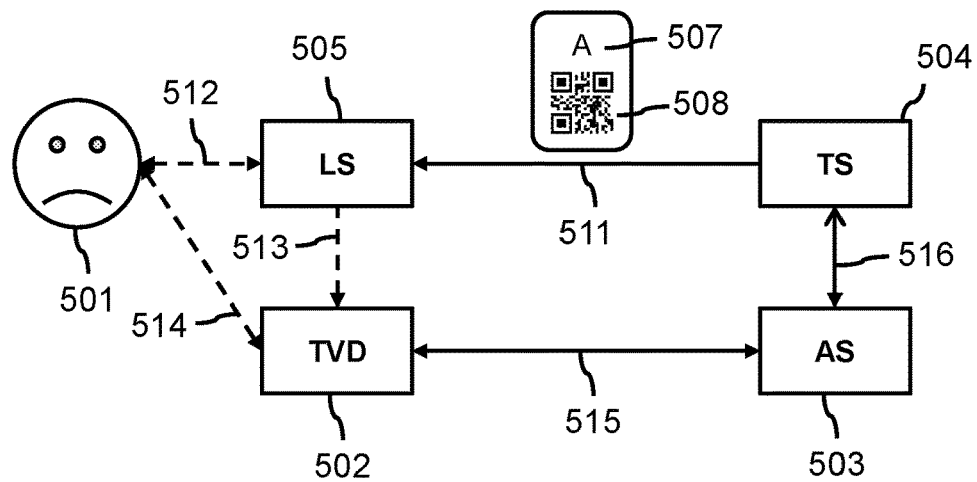
FIG. 5a shows a detailed example of performing a transaction.

FIG. 5a shows a detailed, yet non-limiting, example of performing a transaction. This example does not involve verifying authenticity features of uncoded data of a visual presentation of the transaction.

The figure shows a transaction verification device TVD, 502; an authentication system AS, 503; a transaction system TS, 504; and a local system LS, 505. It will be understood that the considerations discussed with respect to this figure also apply if the functionalities of the transaction system TS and the authentication system AS are combined in a single system.

This figure shows a transaction, e.g., a login, via a web application, in which a transaction verification device TVD of a user, for example, a mobile handset, is used as an authentication means. It is known per se to show coded data in the form of a QR code 508 on the web site to initiate the authentication at the transaction verification device TVD. For example, the QR code 508 may comprise a transaction identifier, e.g., a unique session code; an identifier of the web application, e.g., a URL; and/or a digital signature from the website that may be used by the transaction verification device TVD and/or authentication system AS to recognize that the QR code 508 is of a known website and that it is real.

The transaction may be carried out according to the following flow:

1. The website backend of the transaction system TS generates a unique QR code for the transaction session, which is included on the login page of the real web site. The web site 507 including the QR code 508 is served 511 by the transaction system TS to the local system LS and visually presented 512 via the local system LS to the user 501.
2. The user 501 of the local system uses the transaction verification device TVD, e.g., a smartphone app associated with the authentication system AS, to scan 513 the QR code. The smartphone TVD and/or the authentication system AS checks the data of the website and the session comprised in the QR code 508.
3. The smartphone TVD, via the app, requests the user to confirm the transaction by authenticating 514 using, for example, a pin code, a fingerprint, or face ID.
4. The smartphone TVD, via the app, communicates 515 the result of the authentication to the authentication system AS, e.g., including a transaction identifier included in the QR code.
5. The authentication system AS communicates 516 the result of the authentication to the website backend of the transaction system TS.
6. The website backend TS acts according to the result of the authentication e.g. by showing the requested content or by carrying out the transaction.

Figure 5B:
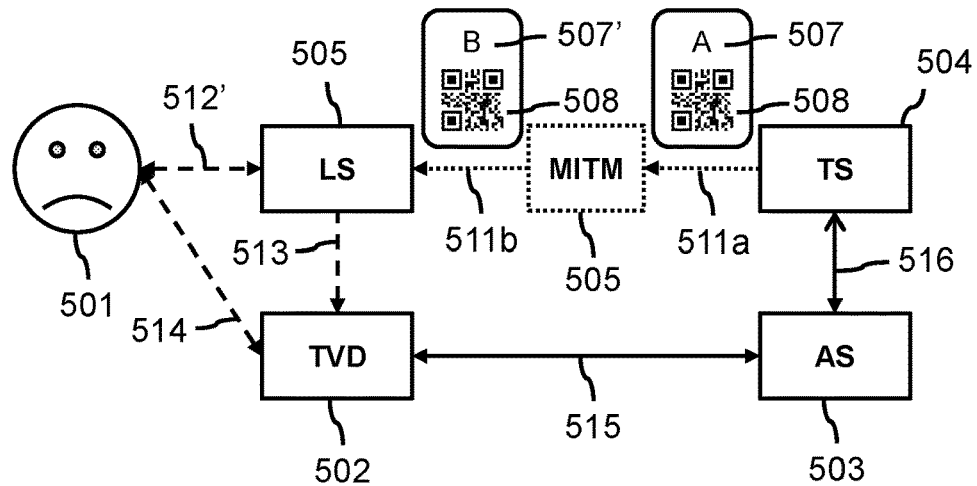
FIG. 5b shows a detailed example of performing a transaction.

FIG. 5b shows a detailed, yet non-limiting, example of performing a transaction. This example is based on the example of FIG. 5a, but in this example, a man-in-the-middle is present in the transaction. Still, no verification of authenticity features of uncoded data of a visual presentation of the transaction takes place.

As in FIG. 5a, the figure shows a transaction verification device TVD, 502; an authentication system AS, 503; a transaction system TS, 504; and a local system LS, 505, where the transaction system TS and the authentication system AS may be combined.

In online transactions, e.g., a login system TS where a user logs in on a website or a payment system TS in which the user carries out a payment transaction, there is a risk of a man-in-the-middle attack taking place. An attacker MITM, 505, may for example place a copy 507' of the real website 507 behind a reverse proxy which decrypts the secure traffic 511b and forwards 511a it to the transaction system TS. In doing this the attacker MITM may for example manipulate transactions or steal login data, while the user 501 thinks they are logging in or performing a transaction at the real website.

With reference to the flow discussed with respect to FIG. 5a, in the presence of the man-in-the-middle attacker MITM, the flow may change as follows.

The man-in-the-middle MITM may provide 511b a fake website 507' to the local system LS for visual presentation 512' to the user 501. This fake website 507' may however contain the QR code 508 of the original website 507 obtained 511a by the man-in-the-middle MITM. The fake website 507' may for example be an exact copy of the actual website 507, except for modifications made by the attacker to modify the transaction. For example, the fake website 507' may show that the user 501 is paying € 5,00 for groceries, whereas, according to the real website 507, the user 501 is transferring € 500 to the attacker MITM. This information from the real website 507 may be extracted by the transaction verification device TVD from the QR code 508 and shown 514 to the user by the transaction verification device TVD via the smartphone app. The user 501 may be supposed to compare this information 514 with the transaction details shown 512' by the local system LS; and/or to verify a URL shown 512' by the web browser of the local system LS. However, the user 501 in practice may not diligently perform these checks, for example because they are in a hurry, meaning that despite the confirmation 514 of the transaction by the user, a man-in-the-middle attack may still take place.

Figure 5C:
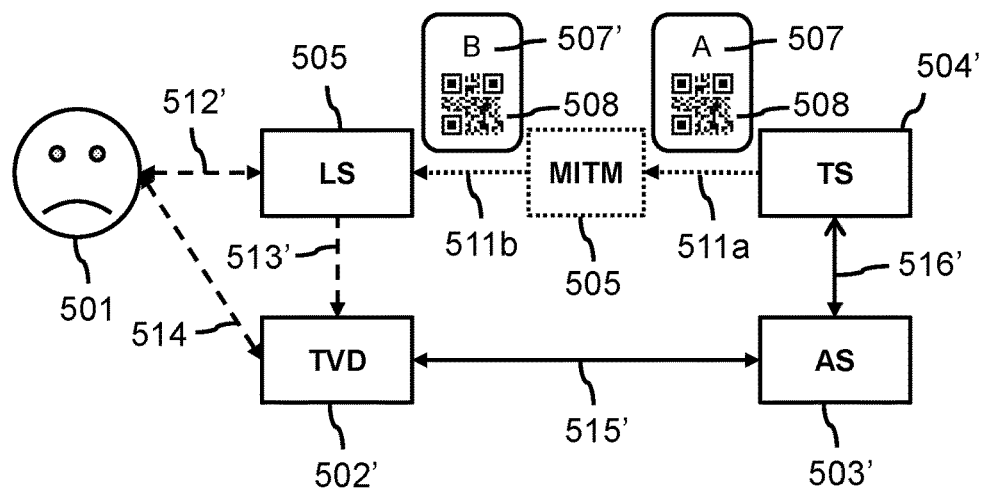
FIG. 5c shows a detailed example of performing a transaction.

FIG. 5c shows a detailed, yet non-limiting, example of performing a transaction. This example is based on the examples of FIG. 5a-5b, but now includes a verification of authenticity features of uncoded data of a visual presentation of the transaction. By performing this verification, effectively, verifications that may previously have been performed by a user, are performed in an automated way and thereby secured.

The figure shows a transaction verification device TVD, 502', an authentication system AS, 503', and a transaction system TS, 504', adapted to enable the verification of authenticity features. The figure further shows a local system LS, 505, operated by user 501, and a man-in-the-middle attacker MITM, 505, attempting to manipulate the transaction taking place. In particular, the man-in-the-middle may attempt to provide 511b to the local system LS a manipulated version 507' of an original web page 507 obtained 511a from the transaction system TS, while including the original coded data 508, thereby trying to trick the transaction verification device TVD into confirming the original transaction 507 instead of the transaction 507' that the user sees 512' on the screen.

As in the previous examples, the transaction verification device TVD may obtain the QR code 508, or other machine-extractable coded data, by taking a camera image 513' of the visual presentation 512' of the transaction to the user 501 of the website 507' as provided by the local system LS. Interestingly, in this example, the transaction verification device TVD may use such camera images not just to extract coded data, but also to verify authenticity features of uncoded data that is also included in the visual presentation 512' but that is separate from the coded data.

To know which authenticity features to check and/or how they are expected to look like, the transaction verification device may obtain verification data from the transaction system TS for verifying the one or more authenticity features. For example, the transaction verification device TVD may request this information using a transaction identifier comprised in the coded data, and obtain this information out-of-band from the transaction system TS. The transaction system TS may for instance communicate 516' this information via the authentication system AS which may forward 515' the information to the transaction verification device TVD. It is also possible for at least part of the verification data to be comprised in the coded data, preferably in a tamper-proof way.

When taking the camera image 513' of the visual presentation, the transaction verification device TVD may simultaneously also capture the authentication features to be verified. The transaction verification device TVD may verify the one or more authenticity features based on the verification data and provide a verification result based on the verifying. Because of these checks, assurance is increased that the transaction that is being authenticated is according to the user's intention. This is because it is ensured that the transaction that is approved 514 using the transaction verification device TVD, and for which the transaction system TS for example obtains a verification result 515', 516' from the transaction verification device, correspond to the transaction presented 512' to the user via the local system LS. Thereby the possibilities for a man-in-the-middle attacker MITM to manipulate the transaction, are greatly decreased.

From a privacy point of view, it is generally desirable for the verification of the authenticity features to be performed on the transaction verification device TVD. This way only the verification result may need to be shared with the authentication system AS and/or transaction system TS. It is however also possible to perform the verification at the authentication system AS and/or transaction system TS, as also discussed elsewhere.

It is possible for the transaction system TS to limit the number of verifications that need to be carried out by checking at which web browser the web application is shown. To this end, when the browser of the local system LS has been used successfully to perform a transaction, a cookie may be included in the website to be stored at the browser. In a later transaction, the transaction system TS may notice based on the cookie that the browser of the local system LS has been used successfully before, and may use fewer or no authenticity features in this case. The browser of the man-in-the-middle attacker MITM is typically not known to the website TS in combination with the transaction verification device TVD of the user, and accordingly, if man-in-the-middle MITM is present, verification of authenticity features as described herein may be performed.

Figure 6A:
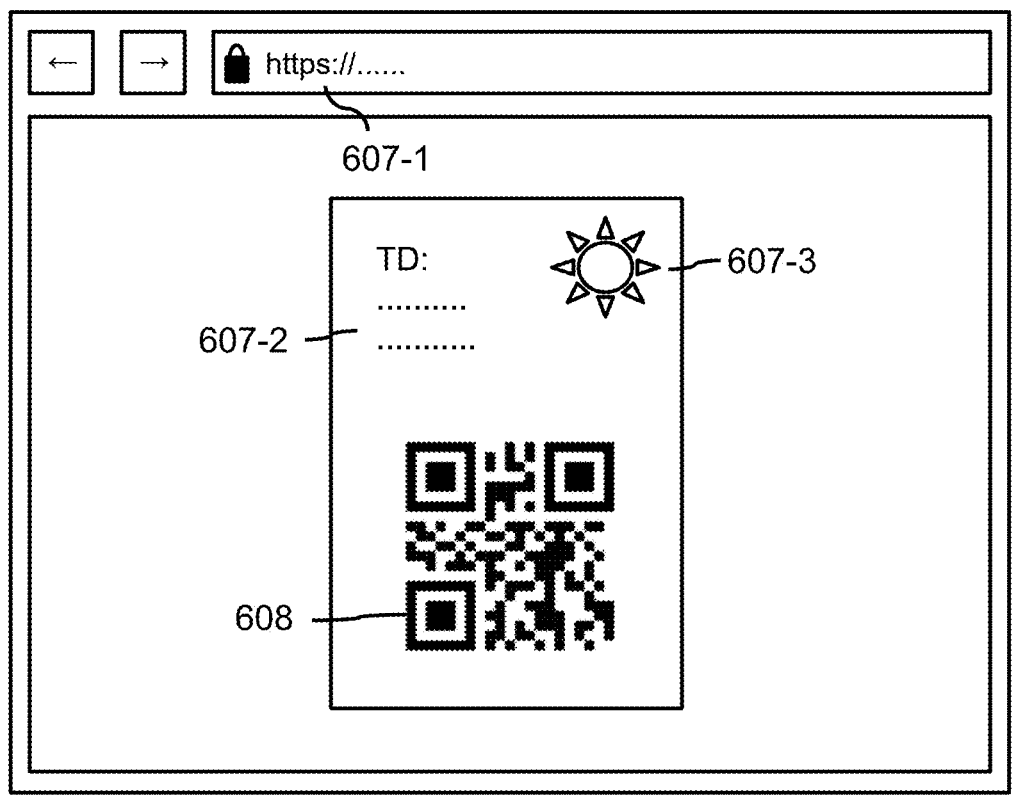
FIG. 6a shows a detailed example of a visual presentation of a transaction.

FIG. 6a shows a detailed, yet non-limiting, example of a visual presentation of a transaction. In this example, the transaction is carried out as a web application served by a transaction system and accessed by a local system operated by the user. Where applicable the options discussed with respect to this figure also apply to other types of visual presentations, however.

As shown in the figure, the visual presentation of the transaction may comprise machine-readable coded data, in this case a QR code 608. Separate from the coded data, the visual presentation may also comprise uncoded data. One or more authentication features may be verified of at least part of this uncoded data. For respective authentication features, respective verification data may indicate which uncoded data is to be checked and/or may provide reference data against which this uncoded data is to be compared.

In an embodiment, the verification data may comprise web address data, such as a URL or pattern against which a URL is matched. The verification may comprise verifying that the browser window that is visible in the one or more camera images and that shows the coded data 608, also shows a web address 607-1 that matches the web address data. Using this option, it may be verified which URL is visible in the address bar of the browser. The verification module may be configured to recognize the address bar, and/or to receive position data indicating an expected position of the web address, e.g., with respect to the location of the coded data. The transaction system may determine this expected position based on which browser was detected, for example. Optical character recognition (OCR) may be used to extract the web address from the camera image. The check may comprise checking that the browser indicates that the connection to the web site is secure, e.g., by checking for a lock icon in the address bar, or the like.

In an embodiment, the verification data may comprise transaction data which may be checked against transaction details 607-2 visible in the presentation. When performing a transaction, typically, the website shows text that summarizes the transaction and that is large enough to be readable by the user. The verification data may comprise for example the exact text to be expected in the visual presentation. This text may be extracted using OCR. The verification data may optionally comprise position data indicating where to expect the transaction information, e.g., with respect to the code data, and/or size data indicating a font size of the shown transaction details 607-2, which may be used in the verification.

In an embodiment, the verification data may comprise website display data which may be checked against a visual appearance of a portion 607-3 of the web page. This may provide protection for example against imperfect copies of a website, or against using the coded data for an entirely different website. For example, a web page portion of at most or at least 100%, at most or at least 200%, or at most or at least 300% of the size of the visual presentation of the coded data may be selected. The web page portion may for example contain a logo, or the like. Again, the verification data may include position data indicating the location of the web page area, e.g., relative to the coded data. The image of the web page portion may be compared for example against HTML code for rendering the web page portion, or an image of the web page portion rendered by the transaction system.

In many cases, the camera image used to verify the authenticity features may be a different camera image than the one that was used to extract the coded data. For example, the coded data from an earlier camera image may be used to obtain information that is used to guide the user into taking the right later camera image for the verification, as also discussed with respect to FIG. 6b. In such cases, it may be verified that the one or more camera images that are used to verify the one or more authenticity features, show the same coded data 608 as was previously extracted and used to obtain the verification data.

Figure 6B:
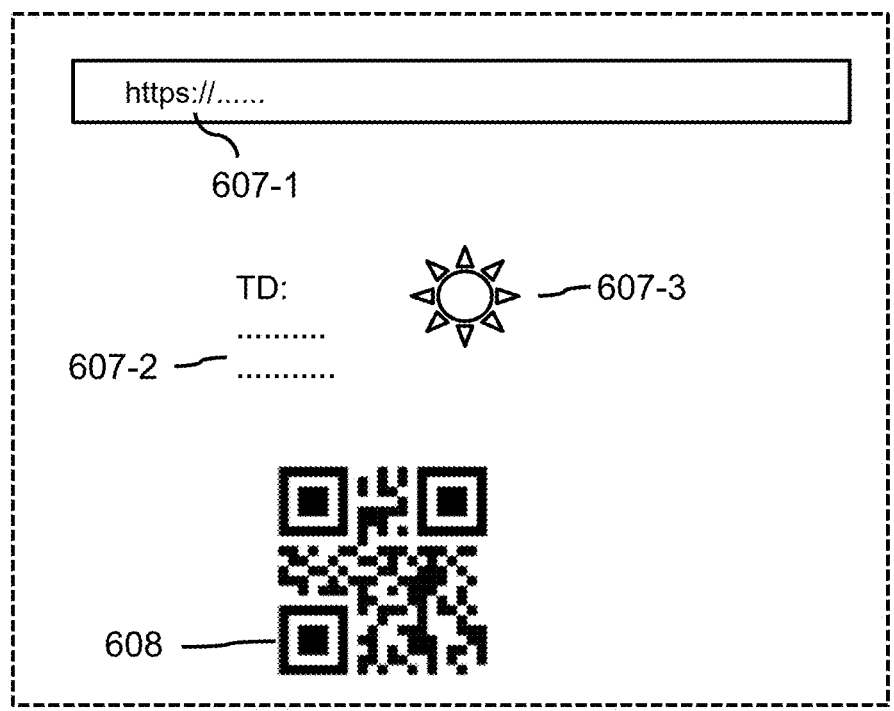
FIG. 6b shows a detailed example of an indication of an expected position of an authenticity feature.

FIG. 6b shows a detailed, yet non-limiting, example of an indication of an expected position of an authenticity feature.

As known per se, while taking a camera image, the transaction verification device may show the current view of the camera, in other words, the camera image currently being taken, on a display. As illustrated in this figure, the transaction verification device may be configured to indicate the expected position of one or more authenticity features in the shown camera image, in other words, the position in the camera image where the authenticity feature is supposed to be. This position data may be included in the verification data that used for verification of the authenticity features, for example, or may be provided separately, e.g., in case the transaction verification device does not perform the verification itself. Optionally, an expected position of the coded data may be indicated as well. Just showing a position for the coded data is typically not sufficient because this may result in an image that does not capture enough of the visual presentation to also verify authenticity features.

The position may be indicated in various ways. In an embodiment, the position of an authenticity feature may be indicated without showing the expected data against which the authenticity feature is verified, e.g., in the form of a box imposed on the camera image. In another embodiment, the position of the authenticity feature may be indicated by showing the expected data. These two possibilities can also be mixed for respective authenticity features. The second possibility is illustrated in the figure, which shows an overlay to be imposed over a camera image. The overlay shows coded data 608; an expected web address 607-1; expected transaction details 607-2; and an expected visual appearance 607-3 of a web page portion.

By showing the expected position of the authenticity feature, it is made easier for the user to capture a camera image that has the authenticity feature at the expected position, and also easier to verify the authenticity feature once a camera image is taken that has the authenticity feature at the expected position. Optionally, the camera image may be automatically taken if it is detected that the authenticity features are at the expected position.

Figure 7:
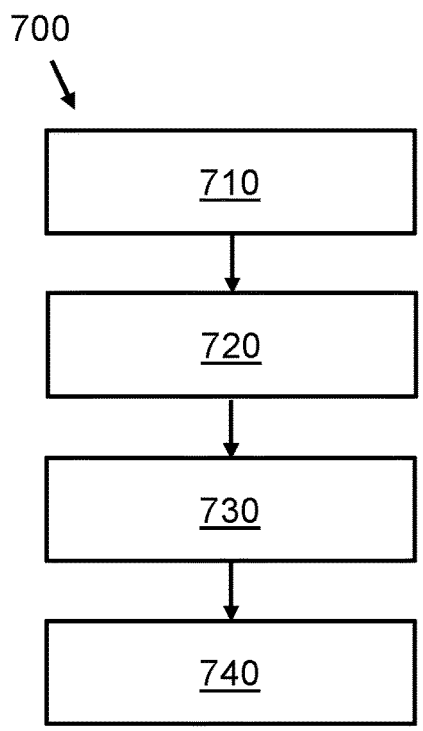
FIG. 7 shows a computer-implemented method of authenticating a transaction.

FIG. 7 shows a block-diagram of computer-implemented method 700 of authenticating a transaction. The transaction may be performed at a transaction system. The method 700 may correspond to an operation of the device 200 of FIG. 2, the system 300 of FIG. 3, or the system 400 of FIG. 4. However, this is not a limitation, in that the method 700 may also be performed using another system, apparatus or device.

The method 700 may comprise, in an operation titled "OBTAIN VISUAL PRESENTATION", obtaining 710, from a transaction verification device, one or more camera images of a visual presentation of the transaction. The visual presentation may comprise uncoded data and machine-extractable coded data.

The method 700 may comprise, in an operation titled "OBTAIN VERIFICATION DATA", based on the coded data, obtaining 720 verification data from the transaction system for verifying one or more authenticity features of at least part of the uncoded data.

The method 700 may comprise, in an operation titled "VERIFY AUTHENTICITY FEATURES", verifying 730 the one or more authenticity features based on the verification data.

The method 700 may comprise, in an operation titled "PROVIDE RESULT", providing 740 a verification result based on the verifying.

Figure 8:
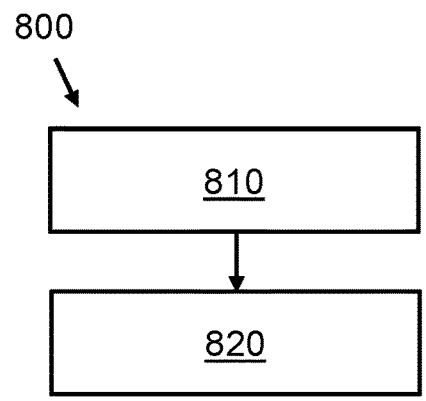
FIG. 8 shows a computer-implemented method of performing a transaction.

FIG. 8 shows a block-diagram of computer-implemented method 800 of performing a transaction. The method 800 may correspond to an operation of the system 400 of FIG. 4. However, this is not a limitation, in that the method 800 may also be performed using another system, apparatus or device.

The method 800 may comprise, in an operation titled "PROVIDE VISUAL PRESENTATION", providing 810 a visual presentation of the transaction. The visual presentation may comprise uncoded data and machine-extractable coded data.

The method 800 may comprise, in an operation titled "PROVIDE VERIFICATION DATA", providing 820 verification data for verifying one or more authenticity features of at least part of the uncoded data.

It will be appreciated that, in general, the operations of method 700 of FIG. 7 and method 800 of FIG. 8 may be performed in any suitable order, e.g., consecutively, simultaneously, or a combination thereof, subject to, where applicable, a particular order being necessitated, e.g., by input/output relations. It is also possible to combine the methods 700 and 800.

In particular, methods 700 and 800 may be combined into an overall method of authenticating a transaction, which may be performed for example by a transaction verification system. For example, as illustrated in FIG. 1a and FIG. 1b, which the steps of method 700 may be performed by a transaction verification device, authentication device, or transaction system of the transaction verification system. The steps of method 800 may be performed by a transaction system of the transaction verification system.

It is also possible combine methods 700 and 800 into an overall method of performing a transaction, which may be performed by a transaction system as described herein, e.g., transaction system 400 of FIG. 4.

Figure 9:
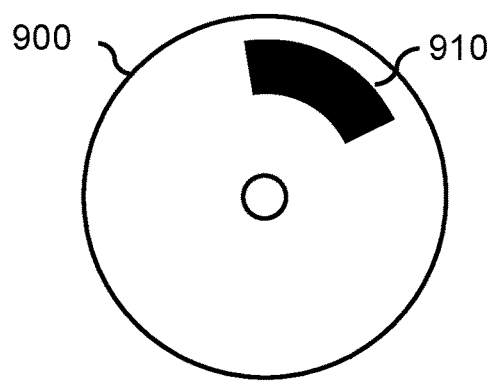
FIG. 9 shows a computer-readable medium comprising data.

The method(s) may be implemented on a computer as a computer implemented method, as dedicated hardware, or as a combination of both. As also illustrated in FIG. 9, instructions for the computer, e.g., executable code, may be stored on a computer readable medium 900, e.g., in the form of a series 910 of machine-readable physical marks and/or as a series of elements having different electrical, e.g., magnetic, or optical properties or values. The medium 900 may be transitory or non-transitory. Examples of computer readable mediums include memory devices, optical storage devices, integrated circuits, servers, online software, etc. FIG. 9 shows an optical disc 900. Alternatively, the computer readable medium 900 may comprise data 910 representing a visual presentation of a transaction comprising uncoded data and machine-extractable coded data, for example, in the form of HTML or other computer code for rendering the visual presentation, as described herein; and/or data 910 comprising verification data for verifying one or more authenticity features of at least part of the uncoded data of a visual presentation of a transaction as described herein.

Figure 10:
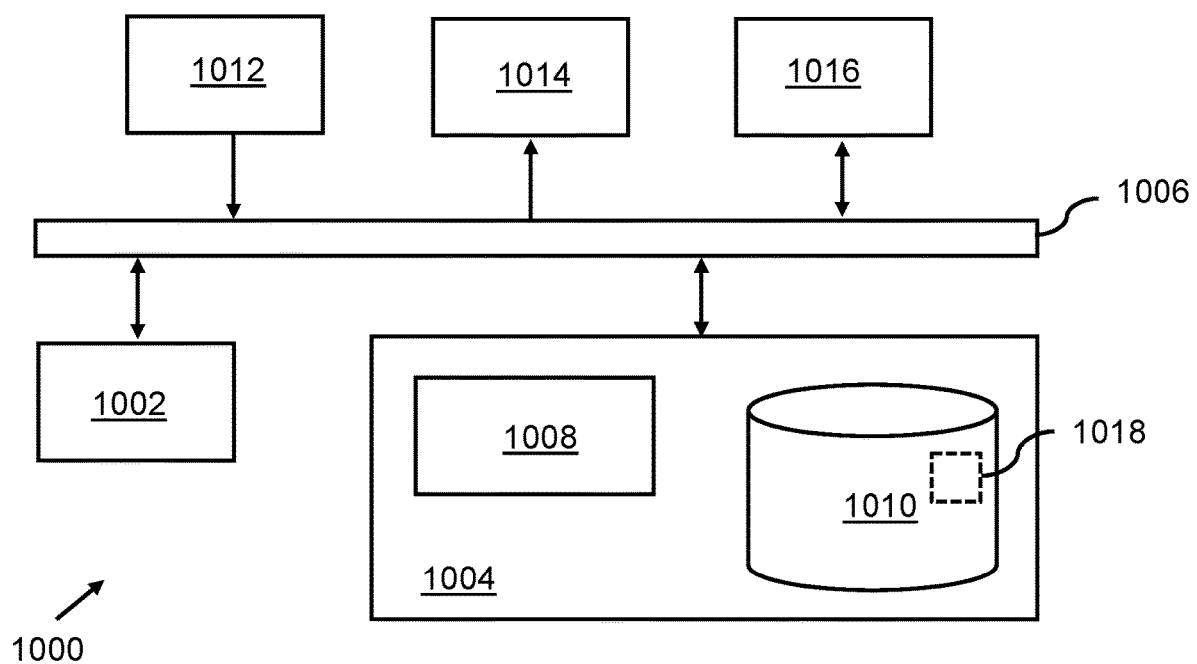
FIG. 10 shows a data processing system.

FIG. 10 is a block diagram illustrating an exemplary data processing system 1000 that may be used in the embodiments described in this specification. Such data processing systems include data processing entities described in this specification, including but not limited to the transaction verification device, authentication system, and transaction system.

The data processing system 1000 may include at least one processor 1002 coupled to memory elements 1004 through a system bus 1006. As such, the data processing system may store program code within memory elements 1004. Furthermore, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

The memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code is otherwise retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 10, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

For example, data processing system 1000 may represent a transaction verification device as described with reference to FIG. 2 and elsewhere in this specification. In that case, application 1018 may represent an application that, when executed, configures data processing system 1000 to perform the functions described with reference to the transaction verification device. In another example, data processing system 1000 may represent an authentication system as described with reference to FIG. 3 and elsewhere in this specification. In that case, application 1018 may represent an application that, when executed, configures data processing system 1000 to perform the functions described with reference to the authentication system. In another example, data processing system 1000 may represent a transaction system as described with reference to FIG. 4 and elsewhere in this specification. In that case, application 1018 may represent an application that, when executed, configures data processing system 1000 to perform the functions described with reference to the transaction system.

Examples, embodiments or optional features, whether indicated as non-limiting or not, are not to be understood as limiting the invention as claimed.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A transaction verification device for authenticating a transaction, wherein the transaction is performed at a transaction system, wherein the transaction verification device comprises:
a camera interface for obtaining camera images;
a processor subsystem configured to:
using the camera interface, obtain one or more camera images of a visual presentation of the transaction, wherein the visual presentation comprises uncoded data and machine-extractable coded data, wherein the uncoded data visually presents information of the transaction to a user that is interpretable by the user, and wherein the coded data is not for human interpretation and is a machine-extractable QR code;
extract the coded data from the one or more camera images;
based on the coded data, obtain verification data from the transaction system for verifying one or more authenticity features of at least part of the uncoded data, wherein at least part of the verification data is cryptographically protected and is included in the coded data;
verify the one or more authenticity features based on the verification data by obtaining web address data from the verification data and verifying that a browser window visible in the one or more camera images shows a web address that matches the web address data;
provide a verification result based on the verifying.

2. The transaction verification device of claim 1, wherein the transaction is visually presented on a screen of a personal computer used to perform the transaction.

3. The transaction verification device of claim 1, wherein the transaction is a login, a payment transaction, a purchase, or an access request.

4. The transaction verification device of claim 1, wherein the processor subsystem is further configured to verify an authentication feature by:
obtaining transaction data from the verification data and verifying that transaction details are visible in the one or more camera images that match the transaction data, and/or
obtaining website display data from the verification data and verifying that a web page portion is visible in the one or more camera images that visually matches the webpage display data.

5. The transaction verification device of claim 1, wherein the processor subsystem is configured to obtain position data from the verification data, wherein the position data indicates an expected position of an authenticity feature in the visual presentation of the transaction; and to use the position data to verify the authenticity feature.

6. The transaction verification device of claim 5, wherein the processor subsystem is configured to show, on a display of the transaction verification device, a camera image being taken of the visual presentation of the transaction, and to indicate the expected position of the authenticity feature in the shown camera image.

7. The transaction verification device of claim 1, wherein the processor subsystem is configured to use the same camera image both to extract the coded data and to verify the one or more authenticity features; or wherein the processor subsystem is configured to verify that the one or more camera images used to verify the one or more authenticity features, show the same coded data as used to obtain the verification data.

8. The transaction verification device of claim 1, wherein the coded data comprises a transaction identifier, and wherein the processor subsystem is configured to obtain at least part of the verification data from the transaction system, optionally via an authentication system, by requesting said data using the transaction identifier.

9. The transaction verification device of claim 1, wherein the transaction verification device is further configured to obtain a confirmation of the transaction via a user interface.

10. The transaction verification device of claim 1, wherein the transaction verification device is a mobile device.

11. The transaction verification device of claim 5, wherein the position data indicates a position and/or direction of the authenticity feature relative to the coded data in the visual presentation of the transaction.

12. The transaction verification device of claim 1, wherein the at least part of the verification data is encrypted or digitally signed.

13. An authentication system for authenticating a transaction, wherein the transaction is performed at a transaction system, wherein the authentication system comprises:
a communication interface configured for communication with a transaction verification device;
a processor subsystem configured to:
obtain, from the transaction verification device, one or more camera images of a visual presentation of the transaction, wherein the visual presentation comprises uncoded data and machine-extractable coded data, wherein the uncoded data visually presents information of the transaction to a user that is interpretable by the user, and wherein the coded data is not for human interpretation and is a machine-extractable QR code;
based on the coded data, obtain verification data from the transaction system for verifying one or more authenticity features of at least part of the uncoded data, wherein at least part of the verification data is cryptographically protected and is included in the coded data;
verify the one or more authenticity features based on the verification data by obtaining web address data from the verification data and verifying that a browser window visible in the one or more camera images shows a web address that matches the web address data;
provide a verification result based on the verifying.

14. The authentication system of claim 13, wherein the at least part of the verification data is encrypted or digitally signed.

15. A transaction verification system for authenticating a transaction,
wherein the transaction is performed at a transaction system, wherein the transaction system is configured to provide a visual presentation of the transaction, wherein the visual presentation comprises uncoded data and machine-extractable coded data, wherein the uncoded data visually presents information of the transaction to a user that is interpretable by the user, and wherein the coded data is not for human interpretation and is a machine-extractable QR code; and to provide verification data for verifying one or more authenticity features of at least part of the uncoded data;
wherein the transaction verification system comprises a transaction verification device configured to obtain, using an image interface, one or more camera images of the visual presentation of the transaction; and
wherein the transaction verification device, or an authentication system to which the transaction verification device is configured to provide the one or more camera images, is configured to:
based on the coded data, obtain the verification data from the transaction system, wherein at least part of the verification data is cryptographically protected and is included in the coded data;

verify the one or more authenticity features based on the verification data by obtaining web address data from the verification data and verifying that a browser window visible in the one or more camera images shows a web address that matches the web address data; and provide a verification result based on the verifying.

16. A computer-implemented method of authenticating a transaction, wherein the transaction is performed at a transaction system, wherein the method comprises:

obtaining, from a transaction verification device, one or more camera images of a visual presentation of the transaction, wherein the visual presentation comprises uncoded data and machine-extractable coded data, wherein the uncoded data visually presents information of the transaction to a user that is interpretable by the user, and wherein the coded data is not for human interpretation and is a machine-extractable QR code;

based on the coded data, obtaining verification data from the transaction system for verifying one or more authenticity features of at least part of the uncoded data, wherein at least part of the verification data is cryptographically protected and is included in the coded data;

verifying the one or more authenticity features based on the verification data by obtaining web address data from the verification data and verifying that a browser window visible in the one or more camera images shows a web address that matches the web address data;

providing a verification result based on the verifying.

\* \* \* \* \*